United States Patent [19]
Hatfield et al.

[11] Patent Number: 5,369,242
[45] Date of Patent: Nov. 29, 1994

[54] SPLIT BEAM LASER WELDING APPARATUS

[75] Inventors: Stephen C. Hatfield; Richard P. Broders, both of Granby, Conn.

[73] Assignee: Combustion Engineering, Inc., Windsor, Conn.

[21] Appl. No.: 162,888

[22] Filed: Dec. 8, 1993

[51] Int. Cl.5 .............................................. B23K 26/00
[52] U.S. Cl. .................................. 219/121.63; 359/639
[58] Field of Search .................... 219/121.63, 121.64, 219/121.75; 359/639, 640, 837

[56] References Cited

U.S. PATENT DOCUMENTS 4,997,250 3/1991 Ortiz, Jr. .................... 219/121.75 X

FOREIGN PATENT DOCUMENTS 4044005 2/1992 Japan .................................... 359/837

Primary Examiner—C. L. Albritton
Attorney, Agent, or Firm—Roanld P. Kananen; John H. Mulholland

[57] ABSTRACT

A system for performing laser welding comprises an optical lens for receiving an incoming laser beam and for dividing the laser beam into a number of different beam segments. The top surface is defined by a number of different surfaces for respectively dividing the laser beam into the number of beam segments. The optical lens has a convex bottom surface for focusing and directing the beam segments onto a respective number of welding locations. Preferably, the laser welding system is used to simultaneously perform five welds on an improved spacer grid assembly which has a cylindrical member located at each intersection of the spacer strips. By simultaneously performing the five requisite welds, the welding time is significantly reduced. Also, the welding process is simplified since the system only has to be in one position to perform all of the welds at each intersection.

14 Claims, 7 Drawing Sheets

SPLIT BEAM LASER WELDING APPARATUS

BACKGROUND OF THE INVENTION

1. Field of the Invention

This invention generally relates to a split beam laser welding apparatus and, more particularly, to a split beam laser welding apparatus for welding an improved spacer grid assembly.

2. Description of the Prior Art

Nuclear fuel assemblies are customarily of the rod type where the fuel rods are held in a separate array by a spacer grid assembly. FIG. 1 illustrates a prior art spacer grid assembly 8, such as the one disclosed in U.S. Pat. No. 4,879,090. The spacer grid assembly 8 is comprised of orthogonal sets of interior strips 10 having mixing vanes 11 as appendages. The interior strips 10 have supports 12 for the fuel rods and are joined together by a plurality of upper intersection welds 13 and lower intersection welds 14. Prior to welding, sacrificial tabs 15 are constructed at the intersection of the interior strips 10.

As discussed in U.S. Pat. No. 5,179,261, which is hereby incorporated by reference, to perform the upper intersection welds 13, cutouts for laser beam access were made at the base of the mixing vanes 11 rather than along their sloping surfaces as in other designs. These cutouts thereby minimized the detrimental effect of degrading the Departure from Nucleate Boiling (DNB) performance that is created by flow turbulence produced at the intersection welds.

A split beam laser welding system was disclosed in U.S. Pat. No. 5,179,261 to overcome the access problems associated with welding this design. This welding system, as shown in FIG. 2, may be comprised of a bifurcating mirror 25 for dividing the beam into a plurality of beam segments and plane mirrors 26 for routing the beam segments 27. Focusing lenses 22 are used to then direct the laser beams into different quadrants of an intersection of the strips 10. The beams may be moved down the strips 10 to induce a flow of molten metal. The resultant weld with this split beam laser welding System can thus be made without melting the mixing vanes 11.

An improved spacer grid assembly is disclosed in co-pending U.S. application Ser. No. 08/027,756, which has a common assignee to the present application. This spacer grid assembly, as shown in FIG. 3, comprises strips that are formed in an "egg crate" arrangement with strips intersecting each other at right angles. A slotted cylindrical member is placed at each intersection so that the cylindrical member encircles the intersection of strips. The tops of the cylindrical members can be shaped or formed with vanes that induce swirl flow within flow channels defined between the fuel rods or deflect part of the flow in one channel into an adjacent channel. This grid may significantly improve the mechanical strength, hydraulic resistance, and thermal performance of the assembly. Other advantages of this improved spacer grid assembly are disclosed in the above-referenced application.

With the improved spacer grid assembly, however, a large number of welds need to be performed in order to fabricate the spacer grid assembly. While the previous spacer grid assembly only required an upper side weld 13 and a lower side weld 14 at each strip intersection, the improved spacer grid assembly may require up to five different welds on each side of the assembly to ensure structural integrity and to achieve maximum mechanical performance from the spacer grid assembly.

For instance, with reference to FIG. 4, a single weld may be required at the intersection of two flat strips. In addition, four welds at each intersection may be necessary to affix the slotted cylindrical tube to the flat strips. Since an additional five welds would be required at the other side of the spacer grid assembly, the improved spacer grid assembly may require up to ten welds for each intersection of the flat strips, as opposed to two welds with the spacer grid assembly shown in FIG. 1.

Using standard welding techniques, this large number of welds would increase the fabrication time significantly since the welding source or the grid assembly itself would be repositioned numerous times for each intersection. Moreover, since the cylindrical members extend above the strips, the welding system or the spacer grid assembly would have to be tilted or rotated to several different orientations in order to perform the welds which join the cylindrical member to the strips. Thus, it would be a problem in the prior art to fabricate the improved spacer grid assembly using standard welding techniques.

SUMMARY OF THE INVENTION

It is an object of the present invention to provide a welding system which can quickly perform a number of welds.

It is also an object of the present invention to provide a welding system which can accurately position a plurality of laser beams to simultaneously perform a plurality of welds.

It is another object of the present invention to provide a welding system which performs the welding with a minimal amount of repositioning.

It is a further object of the present invention to provide a single optical lens which can divide a laser beam into a plurality of beam segments and which can also direct the beam segments to the different weld locations.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a welding system comprises an optical lens for receiving a collimated laser beam. The optical lens is shaped so as to divide the single beam into a plurality of beam segments. The optical lens is also shaped so that the beam segments are focused and directed to separate weld locations in order for the simultaneous welding at a plurality of locations.

The welding system is preferably used to simultaneously perform all of the welds required at an intersection of two strips and one cylinder in a spacer grid assembly. Once the welding system has simultaneously performed all of the welds at a single intersection, either the welding system or the spacer grid assembly is repositioned to perform simultaneously welding at another intersection.

BRIEF DESCRIPTION OF THE DRAWINGS

The accompanying drawings, which are incorporated in, and form a part of, the specification, illustrate embodiments of the present invention and, together with the description, serve to explain the principles of the invention. In the drawings.

DETAILED DESCRIPTION OF THE PREFERRED EMBODIMENT

Reference will now be made in detail to the preferred embodiments of the invention, examples of which are illustrated in the accompanying drawings.

Figure 1:
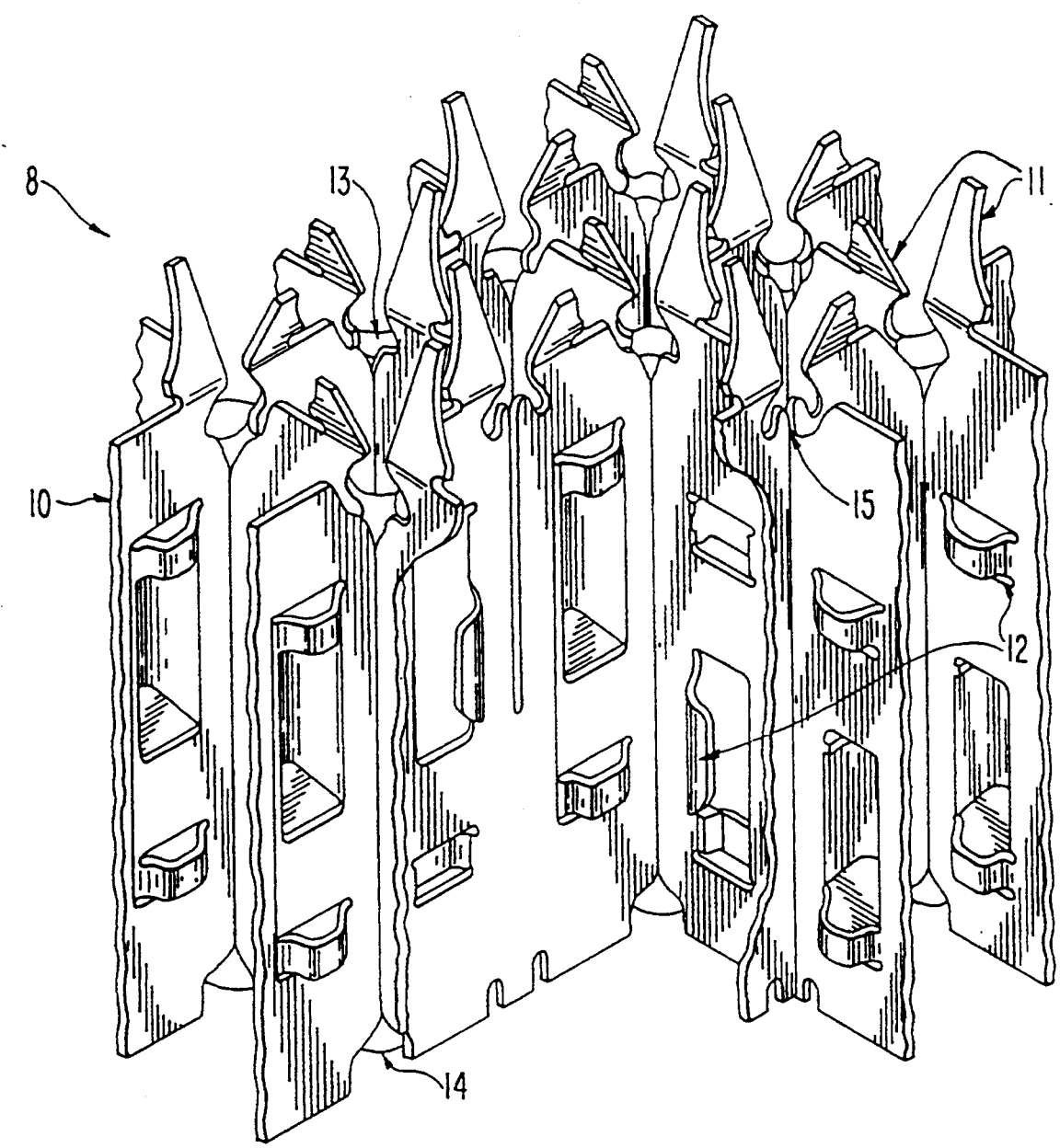
FIG. 1 is a perspective view of a prior art spacer grid assembly.
Figure 2:
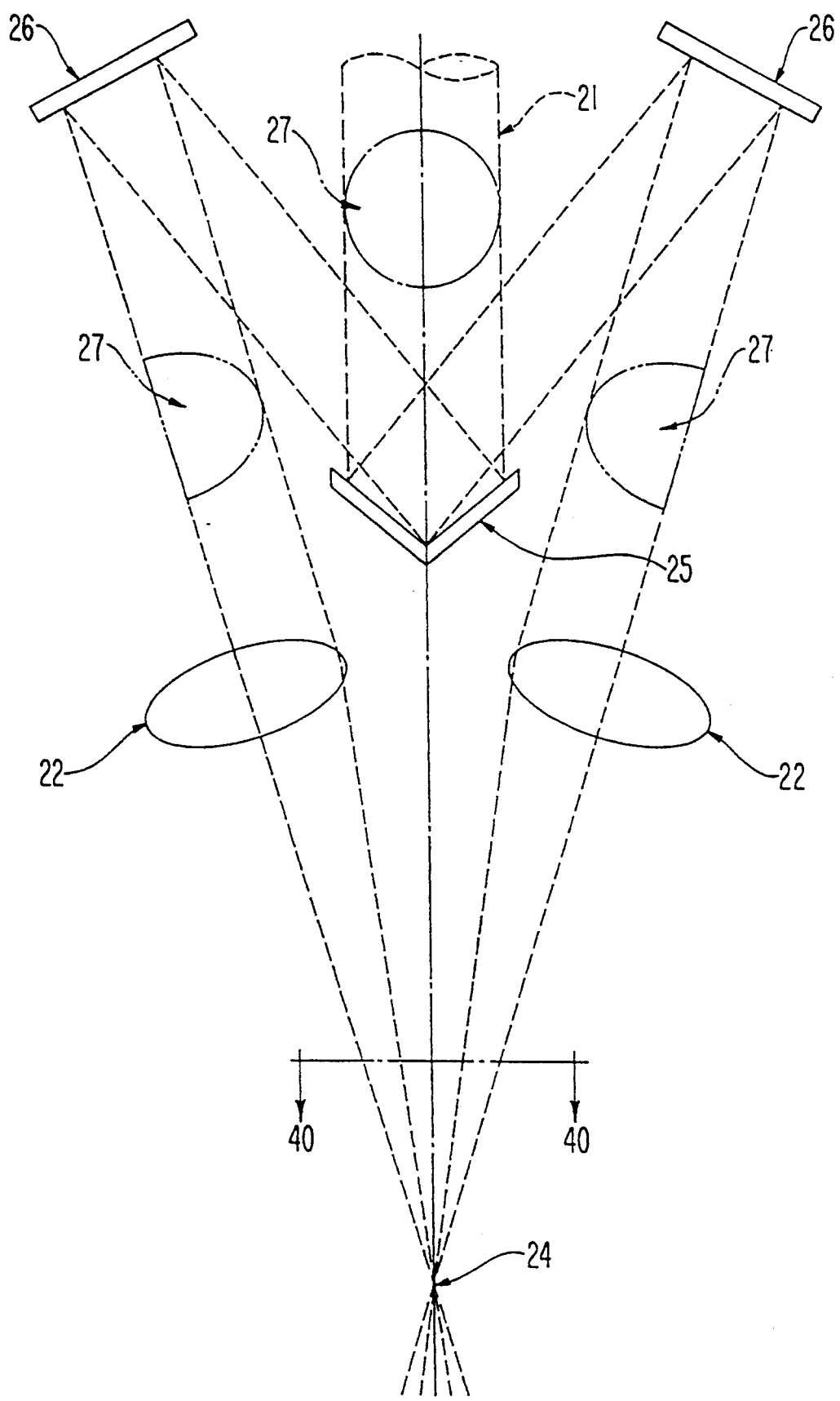
FIG. 2 is a prior art split beam laser welding system.
Figure 3:
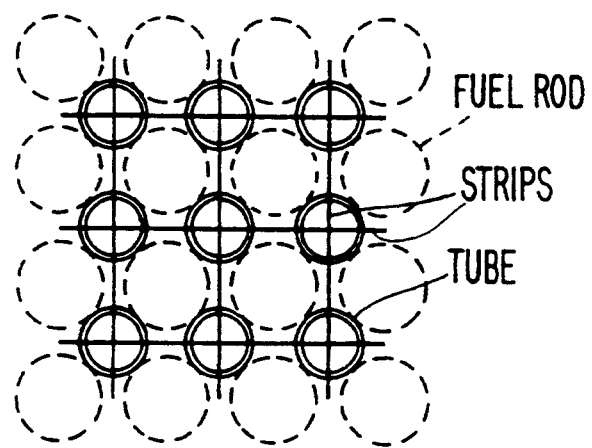
FIG. 3 is a plan view of an improved spacer grid assembly.
Figure 4:
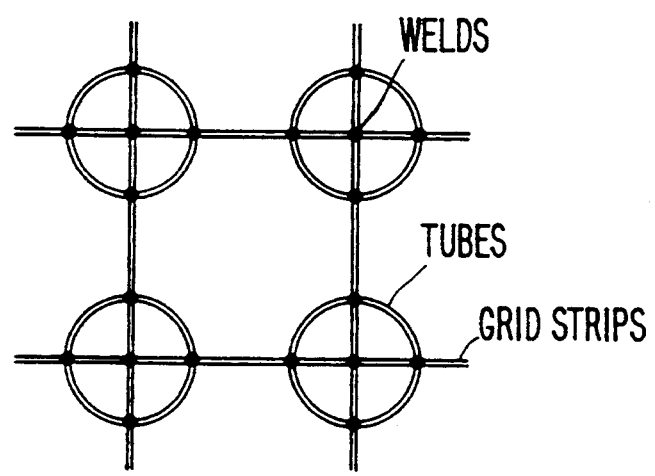
FIG. 4 is a plan view of the improved spacer grid assembly of FIG. 3 illustrating the required weld locations.
Figure 5:
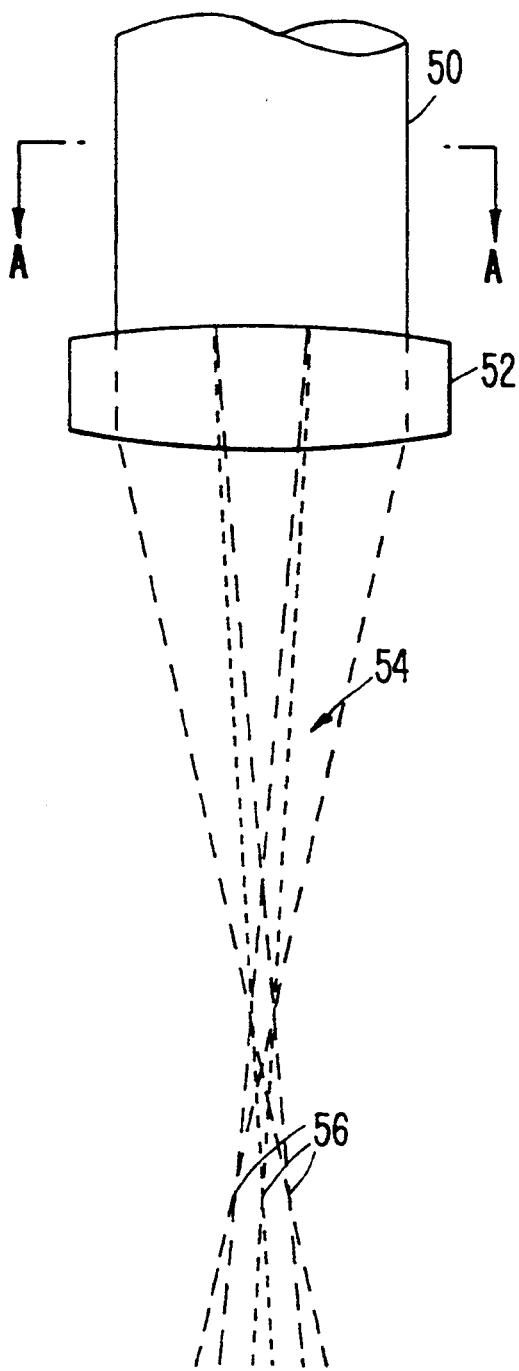
FIG. 5 is a side view of a welding apparatus according to an embodiment of the invention.

With reference to FIG. 5, the welding apparatus of the invention comprises a central optical lens 52 for receiving an incoming collimated laser beam 50. The central optical lens 52 divides the laser beam 50 into a plurality of beam segments 54 and focuses the beam segments 54 into a plurality of focal points 56. Preferably, the laser beam 50 is divided into five laser beam segments for simultaneously performing five separate welds.

Figure 6A:
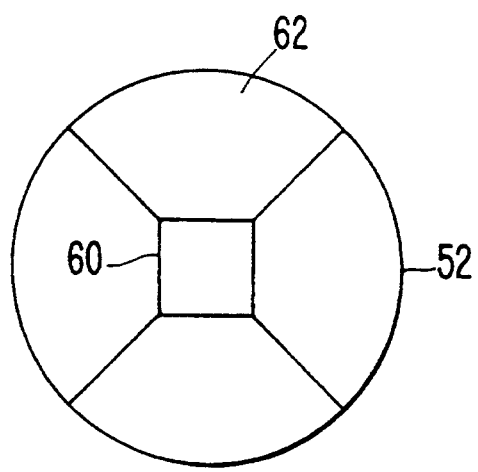
FIG. 6A is a top view of an optical lens used in the embodiment of FIG. 5.
Figure 6B:
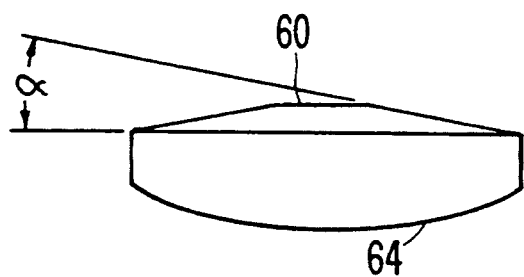
FIG. 6B is a side view of the optical lens used in the embodiment of FIG. 5.

An embodiment Of the optical lens 52 is shown in more detail in FIGS. 6A and 6B. The side of the optical lens 52 which receives the collimated laser beam 50 is defined by a planar central surface 60 surrounded by four angled surfaces 62, each of which is at the same angle α. The other side of the optical lens 52 is defined by a generally convex surface 64.

Figure 7:
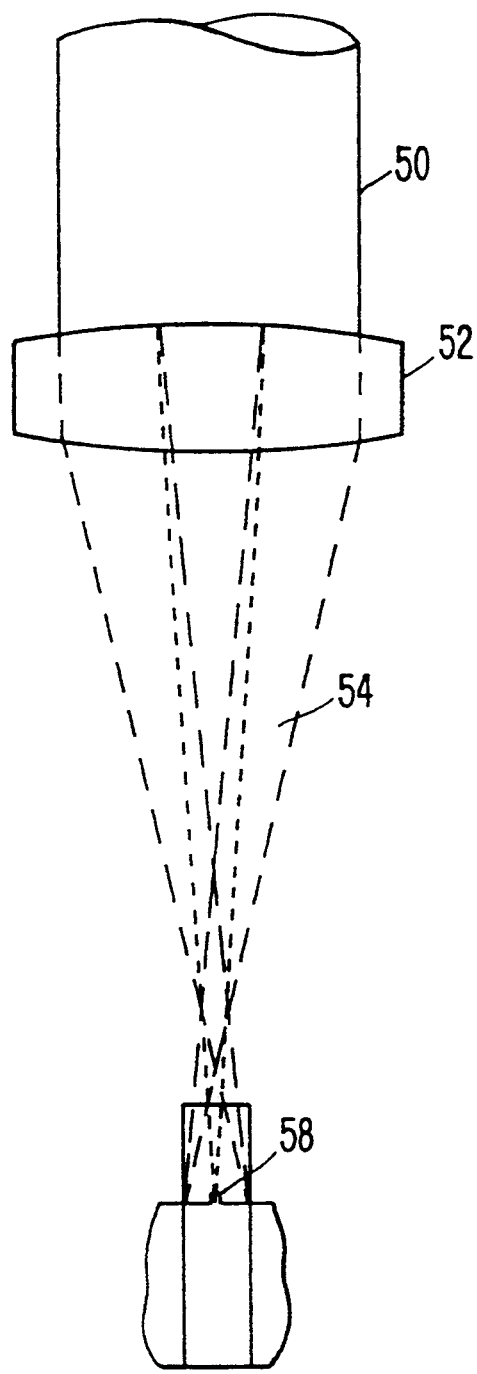
FIG. 7 illustrates the welding apparatus of FIG. 5 in operation.

In operation, With reference to FIG. 7, the optical lens 52 divides the incoming collimated laser beam 50 into five separate beams 54. The portion of the laser beam 50 which is incident upon the planar central surface 60 of the lens 52 is passed straight through to the convex surface 64 of the lens 52. At the convex surface 64, this portion of the beam 50 is focused and directed onto the weld location joining the strips of the spacer grid assembly.

The portion of the laser beam 50 that is not incident upon the planar central surface 60 is divided by the four angled surfaces 62 into four separate portions. These four portions of the laser beam 50 are focused and directed by the convex surface 64 to the four weld locations where the cylindrical member is joined to the strips.

As should be apparent to one of ordinary skill in the art, the angle α at which the surfaces 62 are ground is proportional to the distance separating the focal points 56 of the individual beam segments 54. The lateral separation, angle of incidence, and vertical focal point elevations of the beam segments 54 and the relative energy content of the central beam and the four side beam segments 54 may be adjusted by controlling the geometries of the optical lens 52.

Thus, with the system shown in FIG. 7, a single laser beam 50 is divided into a plurality of beam segments 54 and directed onto a respective plurality of welding locations. Once the spacer grid assembly is positioned directly below the centerline of the undivided laser beam 50, the laser beam 50 is fired and the divided beam segments 54 are used to produce the five welds.

After the welds have been completed for one intersection, the optical lens 52 and laser beam source may be moved to another intersection for performing a new set of welds. Alternatively, rather than moving the optical lens 52, the spacer grid assembly may be moved into a new position for performing the next set of welds.

By performing five welds simultaneously, the time necessary to fabricate the spacer grid assemblies may be significantly reduced. Moreover, all of the welds at a single intersection may be performed without repositioning the spacer grid assembly and without repositioning the welding equipment. Thus, in addition to reducing the welding time, the welding system also simplifies the welding process.

Figure 8A:
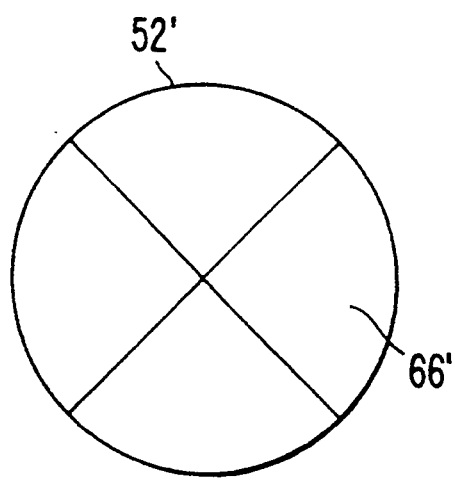
FIG. 8A is a top view of a second embodiment of an optical lens.
Figure 8B:
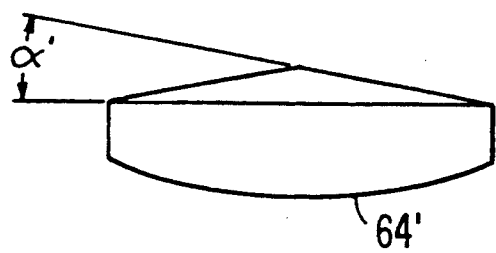
FIG. 8B is a side view of the second embodiment of the optical lens.

A second embodiment of a optical lens 52' is shown in FIGS. 8A and 8B. The side of the optical lens 52' that receives the incoming collimated laser beam 50 is comprised of four angled surfaces 66', each of which are formed at the same angle α'. The other side of the optical lens 52' is ground to have a convex surface 64'.

In operation, the incoming laser beam 50 is divided into four beam portions by the four angled surfaces 66'. These four beam portions are focused and directed by the convex surface 64' onto four different welding locations. These four welding locations may be the four locations that join the slotted cylindrical member to the strips. After the four welds have been performed simultaneously, either the optical lens 52' or the spacer grid assembly is repositioned to perform simultaneously welding at another set of four welding locations.

The foregoing description of the preferred embodiments of the invention has been presented for purposes of illustration and description. It is not intended to be exhaustive or to limit the invention to the precise forms disclosed. Many modifications and variations are possible in light of the above teaching.

For example, although the split beam laser welding system has been described with reference to an improved spacer grid assembly, the welding system may alternatively be used to perform simultaneous welding on other spacer grid assemblies as well as on other workpieces other than spacer grid assemblies. Also, the geometry of the optical lens 52 may be altered in accordance with a desired number of beams, a desired distribution of the laser beam energy, and a desired beam segment separation.

The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. A system for performing laser welding, comprising:

an optical lens having a top surface for receiving an incoming laser beam and a having a bottom surface for emitting a plurality of beam segments;

said top surface comprising a planar central surface surrounded by four angled surfaces; and said bottom surface comprising a convex surface;

wherein said planar central surface and said four angled surfaces divide said incoming laser beam into five beam portions, said five beam portions being focused and directed by said convex surface onto a respective five welding locations.

2. The system for performing laser welding as set forth in claim 1, wherein said five beam portions simultaneously perform laser welding at said five welding locations.

3. The system for performing laser welding as set forth in claim 1, wherein said planar central surface defines a beam portion which is directed to an intersection of two .strips in a spacer grid assembly.

4. The system for performing laser welding as set forth in claim 1, wherein said four angled surfaces define four beam portions which are respectively directed to four welding locations that join a cylindrical member to two strips in a spacer grid assembly.

5. The system for performing laser welding as set forth in claim 2, wherein said five welding locations are located at a single intersection of two strips and a cylinder in a spacer grid assembly.

6. The system for performing laser welding as set forth in claim 5, wherein after said system simultaneously performs five welds at said five welding locations, said optical lens is repositioned to simultaneously weld five other welds at a second intersection of two strips in said spacer grid assembly.

7. The system for performing laser welding as set forth in claim 5, wherein after said system simultaneously performs five welds at said five welding locations, said spacer grid assembly is repositioned relative to said optical lens to simultaneously weld five other welds at a second intersection of two strips in said spacer grid assembly.

8. A system for performing laser welding, comprising:

an optical lens having a top surface for receiving an incoming laser beam and a having a bottom surface for emitting a plurality of beam segments;

said top surface being divided into a plurality of surfaces; and said bottom surface comprising a convex surface;

wherein said plurality of surfaces on said top surface divide said incoming laser beam into a respective plurality of beam portions, said plurality of beam portions being focused and directed by said convex surface onto a respective plurality of welding locations for performing simultaneous welding at said plurality of welding locations.

9. The system for performing laser welding as set forth in claim 8, wherein said plurality of surfaces comprise four quadrants of said top surface for dividing said laser beam into four beam portions.

10. The system for performing laser welding as set forth in claim 8, wherein said plurality of surfaces comprise five separate surfaces for dividing said laser beam into five beam portions.

11. The system for performing laser welding as set forth in claim 10, wherein said five separate surfaces comprise a planar central surface surrounded by four angled surfaces.

12. A method for performing laser welding, comprising the steps of:

receiving an incoming laser beam at an optical lens, said optical lens being formed with a plurality of top surfaces for receiving said incoming laser beam;

dividing said incoming laser beam into a plurality of beam portions by using said plurality of surfaces on said optical lens;

focusing and directing said plurality of beam portions onto a plurality of different welding locations by using a convex bottom surface of said optical lens; and performing welding with said plurality of beam segments simultaneously at said plurality of different welding locations.

13. The method for performing laser welding as set forth in claim 12, further comprising the step of moving said optical lens to another plurality of welding locations after said plurality of beam segments simultaneously perform said step of welding.

14. The method for performing laser welding as set forth in claim 12, further comprising the step of repositioning a workpiece to another position to weld another plurality of welding locations after said plurality of beam segments simultaneously perform said step of welding.

* * * * *